Sept. 29, 1931.  W. H. SIDDALL  1,825,427
METHOD OF MAKING EYEGLASS PARTS
Filed Nov. 25, 1927
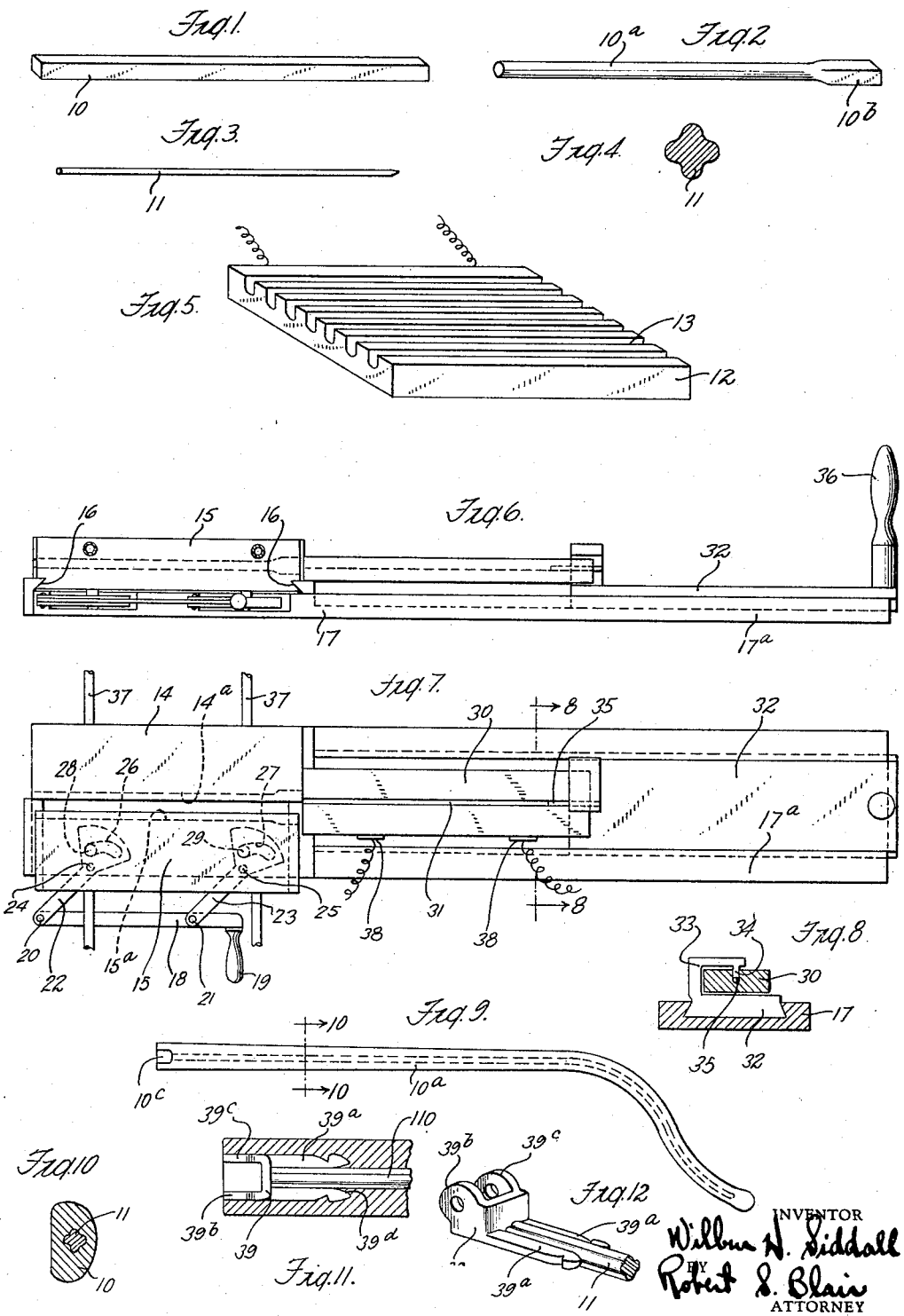

Patented Sept. 29, 1931

1,825,427

UNITED STATES PATENT OFFICE

WILBUR H. SIDDALL, OF ATTLEBORO, MASSACHUSETTS, ASSIGNOR TO BAY STATE OPTICAL COMPANY, OF ATTLEBORO, MASSACHUSETTS, A CORPORATION OF MAINE

METHOD OF MAKING EYEGLASS PARTS

Application filed November 25, 1927. Serial No. 235,724.

This invention relates to the construction of eyeglasses or eyeglass parts and, with regard to its more specific features, to the construction of eyeglass temple bars.

One of the objects of the invention is to provide a thoroughly practical and efficient art or method of inserting metal parts into eyeglass parts of non-metallic material such as celluloid or the like, for reinforcement or other purposes. Another object is to provide a practical art of reinforcing non-metallic eyeglass parts such as non-metallic temple bars. Another object is to provide a simple and accurate method of providing a metallic reinforcement in a non-metallic temple bar member. Another object is to provide a practical apparatus for rapidly carrying out an art or method of the above nature. Another object is to provide a reinforced temple bar of celluloid or the like in which the reinforcement is not objectionably visible. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawings, in which is shown one of the various possible embodiments of the mechanical features of this invention, Figure 1 shows in perspective a non-metallic temple bar member at an early stage in its manufacture;

Figure 2 is a perspective view of the temple bar member at a later stage;

Figure 3 shows a metal reinforcing member;

Figure 4 is a transverse section showing the reinforcing member on an enlarged scale;

Figure 5 is a perspective view of a part of the apparatus employed;

Figure 6 is a side view of another part of the apparatus;

Figure 7 is a top view of the apparatus shown in Figure 6;

Figure 8 is a section taken as indicated by the line 8—8 in Figure 7;

Figure 9 is a side elevation of a temple bar in finished shape;

Figure 10 is a section taken as indicated by the line 10—10 of Figure 9;

Figure 11 is a longitudinal section through an end portion of the completed temple bar, and Figure 12 is a perspective view showing a hinge member and the end portion of the metal reinforcing wire.

Similar reference characters refer to similar parts throughout the several views of the drawing.

Referring now to the drawing in detail, there is shown in Figure 1 a member 10 of non-metallic material which is rectangular or square in cross-section and of approximately the required length for forming an eyeglass temple bar. The member 10 is of celluloid or other similar non-metallic material employed in the construction of eyeglass parts, and the term "celluloid", as employed hereinafter, is to be interpreted broadly to comprehend various non-metallic materials having properties similar to those of celluloid and used in the construction of eyeglass frames or temple bars or parts therefor. The member 10, as shown in Figure 1, may be formed in any desired manner, but it is preferably formed by cutting the square rod from a sheet or strip of the celluloid stock.

In Figure 3 there is shown a metal wire member 11 which is to be inserted into the celluloid member to serve as a reinforcement and to hold the temple bar in shape after it has been completely formed and bent to its curved contour. The wire member 11 is shown herein of sufficient length to extend substantially throughout the length of the celluloid temple bar member 10, but it is to be understood that a metal reinforcement such as the wire 11 may be inserted into any desired portion of the length of the temple bar.

The member 10 having been cut from a sheet of celluloid in the shape shown in Figure 1, it is then shaped to the form shown in Figure 2, the major portion 10a thereof being reduced to the shape of a cylinder, leaving a small end portion 10b in its original shape. The reduction of the square rod 10 to the cylindrical rod 10a may be accomplished in any desired manner but is preferably done by turning, as in a lathe. The celluloid member, shaped as shown in Figure 2, is now softened by suitable treatment, preferably by heating. In Figure 5 there is shown an electrically heated block 12 having in its surface a plurality of grooves 13 for the reception of the temple bar members to be softened. The celluloid temple bar member is heated in the heating device 12 until it is softened throughout to such an extent that the metal wire member 11 can be forced or driven axially thereinto. If it is attempted to force the wire 11 into the temple bar member while the celluloid throughout the temple bar is in this softened condition, great difficulty is experienced due to the wire member not remaining coaxial with the temple bar member and tending to work out along the sides of the celluloid member. In the finished article it is desirable that the wire reinforcement be centered throughout the length of the temple bar and completely and uniformly embedded therein. Uneven density of the celluloid and the difficulty of accurately directing the wire member as it is forced thereinto render the proper positioning of the reinforcing wire very doubtful if it is attempted to insert the wire while the celluloid temple bar member is in a softened condition throughout.

In accordance with a feature of the present invention, after the celluloid temple bar has been softened throughout, as by means of a heating device such as shown in Figure 5, the outer surface portions thereof are chilled and thereby hardened, leaving the interior still in a softened condition. The wire reinforcing member is then forced axially into the temple bar member and along the softened interior thereof and is, in effect, guided in its movement by the harder outer shell so that it is dependably positioned in its proper coaxial relation to the celluloid temple bar member. The hardened exterior of the celluloid member will not permit the wire, as it moves along therethrough, to deviate from its proper course.

Referring again to the drawings, there is shown a pair of separable clamping members 14 and 15 having in their opposing faces complementary grooves 14a and 15a shaped to receive and clamp the celluloid member shaped as shown in Figure 2. This clamping device is conveniently formed with the part 14 thereof stationary and the part 15 thereof slidable toward and away from the part 14 to effect gripping and releasing of the temple bar members. As shown in Figure 6, the clamping member 15 is slidably supported by suitable V-ways 16 upon a base 17. Exterior of the member 15 is a bar 18 provided with a handle 19. Connected to the bar 18, at 20 and 21 respectively, are a pair of arms 22 and 23 which extend into slots in the base 17 and are pivoted therein at 24 and 25 respectively. These arms 24 and 25 have at their inner ends eccentric slots 26 and 27 which engage with pins 28 and 29 respectively which project from the sliding clamping member 15. Thus, by grasping the handle 19 and moving the bar 18 toward the right, as viewed in the drawings, the member 15 is moved toward the member 14 to clamp the celluloid member.

Closely adjacent to the right-hand end of the clamping members 14 and 15 is positioned a block 30 having therein a longitudinal groove 31. This groove is adapted to receive the wire reinforcing member 11 and it is so positioned with respect to the clamping members that, when the temple bar member is in position in the clamping device, the wire member, positioned in the bottom of the groove 31, is alined with the axis of the temple bar member.

The base 17 is elongated, as shown at 17a, and mounted therein is a slide 32, slidable lengthwise of the base portion 17a toward and away from the clamping members 14—15. The slide 32 has adjacent its left-hand end, as viewed in the drawings, a part 33 which extends upwardly about one side of the block 30 and thence arches over the upper surface of the block 30, as best shown in Figure 8. This part 33 has a depending portion 34 which rests in the groove 31 and has projecting therefrom, along the base of the groove, a short finger or rod 35. The slide 32 is adapted to be moved lengthwise of the base 17a by any suitable means and, in this instance, is shown provided with a handle 36 by means of which it may be moved manually.

The celluloid temple bar member, shaped as shown in Figure 2 and softened by the heating device 12, is clamped between the clamping members 14 and 15. These clamping members are cool, being cooled if desired by means of water or air circulation, as indicated by the pipes 37 leading thereinto. Thus, when the softened temple bar member is clamped, the outer portions thereof are at once chilled and hardened. The wire reinforcing member 11 is positioned in the groove 31 and thereupon the slide 32 is moved toward the left, as viewed in the drawings. As the slide 32 is thus moved, the finger 35 engages the end of the wire member 11 and forces the wire member axially into the celluloid member. The block 30 is preferably heated, as by electricity, as indicated by the terminals 38, so that the wire member is in a heated condition as it is forced into the celluloid.

Thus, when the wire is forced into the celluloid rod, the interior of the celluloid is in a softened condition to permit free passage of the wire, and the outer portions of the celluloid are relatively hard. The wire is thus dependably guided in its movement and passes into the celluloid member in the desired coaxial relation thereto. The cylindrical shape of the celluloid member at this stage is of great advantage since it ensures that the material of the celluloid member will be cooled and hardened to substantially the same depth on all sides, leaving the softened central portion for the passage of the wire member.

Preferably, the reinforcing wire 11 is inserted into the temple bar member from the forward end, which is the end upon which the temple bar hinge member is mounted. This avoids disfiguring the rear end of the temple bar and avoids the necessity of closing a rear end opening through which the wire has passed. The finger 35 follows the wire member into the celluloid member to some distance so that the end of the metal member is spaced from the end of the celluloid member.

After the reinforcing wire 11 has been inserted, the temple bar, with the wire member therein, is finished off to the desired outer shape and is bent to the desired contour. In Figure 4 there is shown a curved temple bar with the reinforcing wire member 11 therein. At any desired stage after the wire 11 has been inserted, the hinge member 39 is forced into the forward end portion of the temple bar, following the wire member. The hinge member preferably employed comprises a rearwardly extending notched part having two arms 39a, which is forced into and embedded in the celluloid, and a pair of spaced ears 39b and 39c between which a lug on the eyeglass frame is received.

When the hinge member 39 is forced into the forward end of the celluloid temple bar member, the two arms 39a embrace the end portion of the core 11, as shown in Figures 11 and 12. In the formation of the celluloid temple bar member, there is cut or otherwise formed in the forward end thereof a recess 10c, as shown in Figure 9, which is open at the forward end of the temple bar and at the inner side thereof. The core 11 is preferably of such length that its forward end comes substantially to the rear wall of the recess 10c. After the wire core has been inserted as described above, the hinge member 39 is positioned with the arms 39a thereof in the recess 10c and resting against the outer wall of the recess. The celluloid is then suitably softened and the hinge member is forced rearwardly until it reaches the position shown in Figure 11. The opposing faces at the ends of the arms 39a are rounded off as shown at 39d so that the arms slide over the core 11 and embrace the core as the hinge member is forced inwardly even though the space between the two arms is not accurately alined with the core when the inward movement of the hinge member is started; the core serves to guide the hinge member into its proper position. It will be seen that this construction strengthens the temple bar at its forward end portion and avoids a weak joint between the forward end of the core and the hinge member.

The wire reinforcing member 11 is preferably shaped in cross-section substantially as shown in Figure 4, the surface thereof being provided with smoothly rounded corrugations. A wire member shaped as shown in Figure 4 enters the celluloid much more freely than a plain cylindrical wire and has less tendency to bend as it is being forced into the celluloid. Also, a longitudinally corrugated reinforcing member is less plainly visible in the finished temple bar than is a round wire. A reinforcing wire having a smooth cylindrical surface is magnified in appearance very considerably when viewed through the celluloid covering thereabout, due to refraction of the light rays passing through the celluloid. The alternating convex and concave surfaces of a metal member shaped as shown in Figure 4, overcome this effect and substantially does away with the appearance of increased size. In addition, the core or reinforcing wire is preferably plated with green gold or other material to give a similar color, thereby further reducing its visibility.

From the foregoing, it will be seen that the invention herein described achieves advantages of important practical value. The metal reinforcing member is dependably guided and positioned during the process of its insertion. After insertion of the reinforcement the celluloid temple bar may be finished down to the desired size and shape without danger of exposing the metal. Although the invention achieves particular advantages in reinforcing temple bars as described herein, it will be understood that the method employed may be adapted to the construction of eyeglass frame parts other than temple bars.

As many possible embodiments may be made of the mechanical features of the above invention and as the art herein described might be varied in various parts all without departing from the scope of the invention, it is to be understood that all matter hereinabove set forth or shown in the accompanying drawings is to be interpreted as illustrative and not in a limiting sense.

I claim:

1. The herein described art of making eyeglass parts which consists in softening a portion of a non-tubular celluloid member and inserting a metal part into said softened portion, said metal part being guided in its movement by the relatively hard portions of the celluloid adjacent to said softened portion.

2. The herein described art of making eyeglass parts which consists in forcing a metal wire endwise into a softened portion of a non-tubular celluloid member, and guiding said wire by means of relatively hard celluloid portions adjacent to said softened portion.

3. The herein described art of making eyeglass parts which consists in softening a celluloid member, hardening portions thereof, and inserting a metal member into the unhardened portions.

4. The herein described art of making eyeglass parts which consists in softening the central portion of an elongated non-tubular celluloid member relative to the outer portions thereof and inserting into said softened central portion a metal wire.

5. The herein described art of making eyeglass parts which consists in softening a celluloid member, hardening the outer portions thereof, and inserting a reinforcing member into the softened inner portion thereof.

6. The herein described art of making eyeglass parts which consists in softening an elongated celluloid member, hardening the outer portions thereof, and driving axially into the inner portion thereof a reinforcing wire.

7. The herein described art of making eyeglass parts which consists in heating a celluloid member to soften it, cooling portions thereof to harden said portions, and thereupon inserting a metal member into the unhardened portions, the metal member being guided in its movement by the hardened portions.

8. The herein described art of making eyeglass parts which consists in heating an elongated celluloid member to soften it, cooling the outer surface thereof to harden the outer portions, and thereupon forcing into said celluloid member lengthwise from an end thereof a metal wire member.

9. The herein described art of making eyeglass parts which consists in heating a celluloid member to soften the same, inserting said softened member into a relatively cool clamping device to chill and harden the outer portions thereof, and inserting a metal member into the central portion of said celluloid member while it is held in said clamping device.

10. The herein described art of making eyeglass parts which consists in providing a celluloid member roughly in the shape of a temple bar, softening said temple bar member, hardening the surface portions thereof, inserting a metal wire axially thereinto from one end, allowing the entire celluloid member to harden, and then finishing the celluloid member into a completed temple bar.

11. The herein described art of making eyeglass parts which consists in providing a non-tubular celluloid member roughly in the shape of a temple bar but substantially straight, reducing the inner portion thereof to a softened condition relative to the outer portions, and inserting a metal wire axially thereinto from one end.

12. The herein described art of making eyeglass parts which consists in heating a celluloid temple bar member to soften the same, placing said softened celluloid member in a relatively cool clamping device to chill and harden the outer portions thereof, and thereupon driving axially into said member from one end thereof a metal wire member.

13. The herein described art of making eyeglass parts which consists in providing a non-tubular celluloid member roughly in the shape of a temple bar but substantially straight, reducing the inner portion thereof to a softened condition relative to the outer portions, inserting axially into said member from the front end a metal wire member, and following said wire member by a hinge member.

14. The herein described art of making eyeglass parts which consists in placing a celluloid temple bar member in a heated device to soften the same, removing said softened member and placing it in a relatively cool clamping device, and thereupon driving a metal wire member axially into said member while said member remains in said clamping device.

In testimony whereof, I have signed my name to this specification this 19th day of November, 1927.

WILBUR H. SIDDALL.